United States Patent [19]
Miura et al.

[11] Patent Number: 5,684,815
[45] Date of Patent: Nov. 4, 1997

[54] UPCONVERSION LASER MATERIAL

[75] Inventors: Kiyotaka Miura; Hiromi Kawamoto; Yoshinori Kubota; Natsuya Nishimura; Yasushi Kita, all of Ube, Japan

[73] Assignee: Central Glass Company, Limited, Yamaguchi, Japan

[21] Appl. No.: 467,679

[22] Filed: Jun. 6, 1995

[51] Int. Cl.$^6$ .................................................. H01S 3/17
[52] U.S. Cl. ............................................. 372/40; 372/66
[58] Field of Search ................................. 372/21, 22, 66, 372/39, 41, 40

[56] References Cited

U.S. PATENT DOCUMENTS

| | | |
|---|---|---|
| 4,803,439 | 2/1989 | Ryan . |
| 4,803,688 | 2/1989 | Lawandy ................................. 372/21 |
| 4,829,537 | 5/1989 | Baer ....................................... 372/66 |
| 5,008,890 | 4/1991 | McFarlane . |
| 5,231,533 | 7/1993 | Gonokami et al. ..................... 372/21 |
| 5,434,878 | 7/1995 | Lawandy ................................. 372/41 |

FOREIGN PATENT DOCUMENTS

| | | |
|---|---|---|
| 0534750 | 3/1993 | European Pat. Off. . |
| 0 549 899 A1 | 7/1993 | European Pat. Off. . |
| 0 589 198 A1 | 3/1994 | European Pat. Off. . |
| 0 640 571 A1 | 3/1995 | European Pat. Off. . |
| 7-41328 | 2/1995 | Japan . |

OTHER PUBLICATIONS

Applied Physics Letters, vol. 63, No. 15, Oct. 11, 1993, pp. 2030–2031, R. Brede et al., "Green Up–Conversion Laser Emission in Er–Doped Crystals at Room Temperature".

Optics Letters, vol. 20, No. 7, Apr. 1, 1995, Washington US, pp. 770–772, Y.Z. Wang et al., "Observation of Cavity Quantum–Electrodynamic Effects in a ND:Glass Microsphere".

Review of Scientific Instruments, vol. 64, No. 3, Mar. 1993, pp. 628–631, H. Taniguchi et al., "Inexpensive Operating System for Whispering–Gallery–Mode Laser Using Dye–Doped . . . ".

Patent Abstracts of Japan, vol. 950, No. 002, & JP–A–07041328 (Central Glass Co., Ltd.).

Database WPI, Sec.Ch, Week 9534, Derwent Publications Ltd., London, GB; Class H01, p. 004, AN 95–258938, "Up–conversion laser material . . . " & JP–A–07 162062 (Central Glass Co. Ltd.).

Database WPI, Sec.Ch, Week 9534, Derwent Publications Ltd., London, GB; Class H01, p. 004, AN 95–258939, "Up conversion laser material . . . " & JP–A–07 162063 (Central Glass Co. Ltd.).

Allain, et al., "Blue Upconversion Fluorozirconate Fibre Laser", Electronics Letters, vol. 26, No. 3, Feb. 1990, pp. 166–168.

Allain, et al., "Room Temperature CW Tunable Green Upconversion Holmium Fibre Laser", Electronics Letters, vol. 26, No. 4, Feb. 1990, pp. 261–263.

Smart, et al., "CW Room Temperature Upconversion Lasing at Blue, Green and Red Wavelengths in Infrared–pumped $Pr^{3+}$–doped Fluoride Fibre", Electronics Letters, vol. 27, No. 14, Jul. 1991, pp. 1307–1309.

Johnson, et al., "Infrared–pumped Visible Laser", Applied Physics Letters, vol. 19, No. 2, Jul. 1971, pp. 44–47.

(List continued on next page.)

*Primary Examiner*—Leon Scott, Jr.
*Attorney, Agent, or Firm*—Keck, Mahin & Cate

[57] ABSTRACT

An upconversion laser material includes a micro-sphere which is doped with an ion of a rare earth element and made of one selected from the group consisting of crystals and glasses. Thus, the micro-sphere achieves the light confinement therein and serves as a resonator. Therefore, the Q-value of the resonator becomes large. With this, it is possible to obtain the upconversion laser oscillation at room temperature.

5 Claims, 1 Drawing Sheet

OTHER PUBLICATIONS

Silversmith, et al., "Green Infrared–pumped Erbium Upconverison Laser", Applied Physics Letters, vol. 51, No. 24, Dec. 1987, pp. 1977–1979.

Tong, et al., "551 nm Diode–Laser–Pumped Upconversion Laser", Electronic Letters, vol. 25, No. 16, Apr. 1988, pp. 1389–1391.

Macfarlane, et al., "Violet CW Neodymium Upconversion Laser", Applied Physics Letters, vol. 52, No. 16, Apr. 1988, pp. 1300–1302.

ENERGY TRANSFER

ESA

UPCONVERSION LASER MATERIAL

BACKGROUND OF THE INVENTION

The present invention relates to an upconversion laser material for obtaining a laser light and particularly a visible laser light, which is used in the fields of optical memory, optical measurement and optical information processing and has a wavelength shorter than the excitation wavelength.

Hitherto, the upconversion laser oscillation using a bulk glass has not yet been found. However, the upconversion laser oscillation has been achieved, using a single-mode glass fiber. For example, Allain et al. (1990) Electronics Letters Vol. 26, No. 3, pp. 166–168 discloses that the upconversion laser oscillation was obtained at 455 and 480 nm in a $Tm^{3+}$-doped fluorozirconate glass fiber co-pumped at 676.4 and 647.1 nm of a krypton ion laser. Furthermore, Allain et al. (1990) Electronics Letters Vol. 26, No. 4, pp. 261–263 discloses that the upconversion laser oscillation was achieved, at room temperature, between 540 and 553 nm in $Ho^{3+}$-doped fluorozirconate glass fiber with a krypton ion laser tuned at 647.1 nm. Still furthermore, Smart et al. (1991) Electron Letters Vol. 27, No. 14, pp. 1307–1309 discloses that the upconversion laser oscillation was obtained at 491 nm, 520 nm, 605 nm and 635 nm in a $Pr^{3+}$-doped fluorozirconate glass fiber pumped simultaneously at 1.01 μm and 0.835 μm of a Ti: sapphire laser.

In case of the above-mentioned fluorozirconate glass fibers, it is necessary to use, as an excitation light source, a pump laser which is superior in coherence and has a large output of at least several hundreds of mW. Examples of such pump laser are a krypton ion laser and a Ti: sapphire laser. Furthermore, there is an increasing demand for other upconversion materials except fluorozirconate glass fibers, such as $InF_3$-based fluoride glasses, chloride glasses, bromide glasses and mixed halide glasses, which are expected to have an upconversion laser oscillation of higher-efficiency. However, it is difficult to form these exemplified glasses into fiber, for the purpose of confining the laser light therein.

There have been various proposals of the use of rare-earth-doped crystals for achieving the upconversion laser oscillation. For example, Johnson et al. (1971) Applied Physics Letters Vol. 19, pp. 44 discloses a green-color upconversion laser oscillation at 550 nm at a temperature of 77 K. in an $Er^{3+}/Yb^{3+}$-doped $BaY_2F_8$ crystal, by a xenon lump excitation. Silversmith et al. (1987) Applied Physics Letters Vol. 51, No. 24, pp. 1977–1979 discloses a green-color upconversion laser oscillation at 550 nm at temperatures up to 77 K. in an $Er^{3+}$-doped $YAlO_3$ crystal. Tong et al. (1989) Electronics Letters Vol. 25, No. 20, pp. 1389–1391 discloses a green-color upconversion laser oscillation at 551 nm in an $Er^{3+}$-doped $LiYF_4$ crystal at a temperature of 40 K. by a diode laser excitation. Macfarlane et al. (1988) Applied Physics Letters Vol. 52, No. 16, pp. 1300–1302 discloses an upconversion laser oscillation at 380 nm at temperatures up to 90 K in a $Nd^{3+}$-doped $LaF_3$ crystal. According to the above disclosures in which rare-earth-doped crystals are used, there is a problem that the temperatures of the upconversion laser oscillation are much lower than room temperature. Furthermore, it is necessary to limit the doping amount of rare earth element ions in the crystals to a certain range, for preventing the phenomena of "concentration quenching" where the laser oscillation diminishes as the concentration of the rare earth element ions exceeds a certain limit. Thus, for the purpose of achieving more efficient absorption of the excitation light, it is necessary to prepare a large-size uniform crystal having an excitation-light irradiation portion of a length of at least several centimeters.

SUMMARY OF THE INVENTION

It is therefore an object of the present invention to provide an upconversion laser material which is free of the above-mentioned drawbacks.

It is another object of the present invention to provide an upconversion laser material in which the laser light is easily confined. It is another object of the present invention to provide an upconversion laser material which enables the upconversion laser oscillation even with a semiconductor laser (excitation light source) having a relatively small output such as about 150 mW. It is another object of the present invention to provide an upconversion laser material which absorbs the excitation light efficiently.

According to the present invention, there is provided an upconversion laser material comprising:

a micro-sphere which is doped with an ion of a rare earth element and made of one selected from the group consisting of crystals and glasses.

According to the present invention, the laser light is effectively confined in the micro-sphere and the micro-sphere itself serves as a resonator. With this, it is possible to substantially increase the Q-value of the resonator, as compared with conventional upconversion laser materials. Therefore, when the micro-sphere of the present invention is used, the upconversion laser oscillation can be more easily obtained at room temperature, as compared with conventional upconversion laser materials.

DESCRIPTION OF THE PREFERRED EMBODIMENTS

Figure 1:
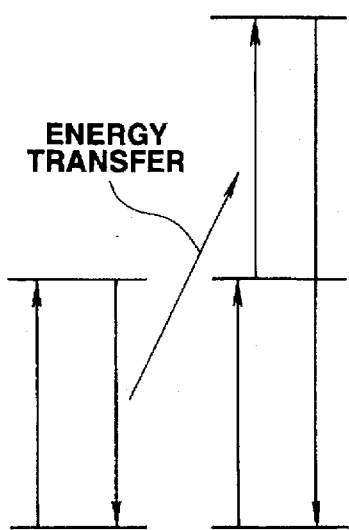
FIG. 1 is a schematic view showing one type of two-step excitation of an ion, caused by the energy transfer thereto from another excited ion.
Figure 2:
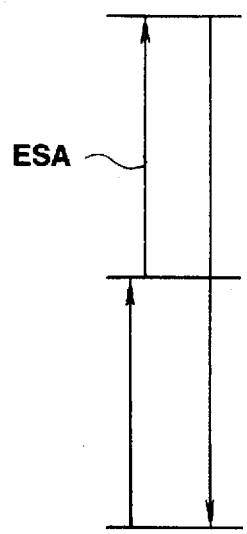
FIG. 2 is a schematic view showing another type of two-step excitation of an ion, caused by the excited state absorption (ESA)
Figure 3:
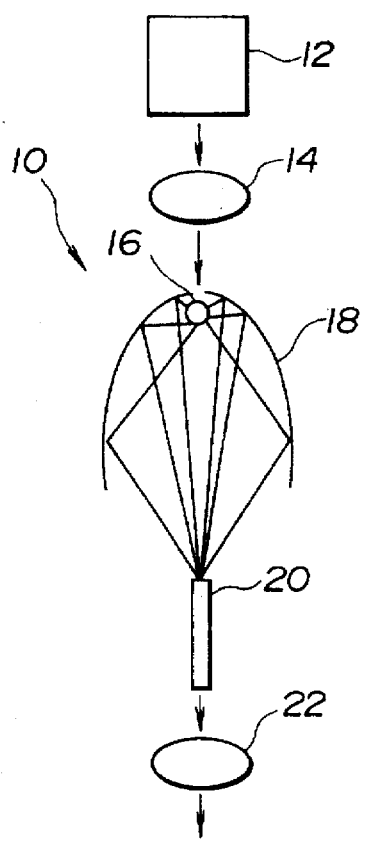
FIG. 3 is a schematic view showing a laser apparatus according to the present invention.

With reference to FIGS. 1–4, a laser material or laser active material for upconversion lasers, i.e., those whose output wavelength is shorter than that of the excitation light source, will be described in accordance with the present invention in the following.

The upconversion laser material of the present invention comprises a micro-sphere containing an ion(s) of a rare earth element(s). In the invention, this micro-sphere is made of either crystal or glass. This rare earth element is at least one selected from the group consisting of erbium (Er), holmium (Ho), praseodymium (Pr), thulium (Tm), neodymium (Nd) and dysprosium (Dy).

The micro-sphere made of crystal is prepared, for example, by grinding a larger-size upconversion laser crystal. The micro-sphere made of glass is prepared, for example, by grinding a larger-size upconversion laser glass or by a method disclosed in JP-A-7-41328. In this method, a glass micro-sphere is prepared by dropping a glass melt into a cooling liquid which is not decomposable at the temperature of the glass melt. Examples of this cooling liquid are liquid nitrogen, carbon tetrachloride and fluorocarbons.

The doped-ion content of the micro-sphere is preferably within a range from 50 to 5,000 ppm and more preferably within a range from 300 to 1,500 ppm. If the ion content is less than 50 ppm, the absorption efficiency of the excitation laser light may become inferior. With this, it may become difficult to have an upconversion laser oscillation. If the ion content is more than 5,000 ppm, the phenomena of "concentration quenching" due to an interaction between the rare-earth-element ions may occur. With this, it may become difficult to have an upconversion laser oscillation.

In addition to the rare-earth-element ion, it is optional to add a sensitizing ion such as $Yb^{3+}$ to the micro-sphere, for improving the laser oscillation efficiency.

It is preferable that the micro-sphere has a refractive index of at least 1.3 in the laser oscillation wavelength region. If the refractive index is less than 1.3, the light confinement in the micro-sphere may not be efficiently achieved. With this, the upconversion laser oscillation may not be achieved.

It should be noted that the size (diameter) of the micro-sphere is not particularly limited in the invention. However, in view of handling of the same, the size is preferably within a range from 50 to 2,000 µm and more preferably within a range from 200 to 1,000 µm. As the size of the micro-sphere becomes larger, the light leak from the micro-sphere relatively decreases. With this, the Q-value of the micro-sphere as a resonator becomes larger. Thus, the upconversion laser oscillation is achieved at a lower threshold value. However, as the Q-value of the micro-sphere becomes larger, the number of resonance mode increases. With this, the spectrum of the oscillation line becomes complicated. Thus, it is preferable to decide the size of the micro-sphere depending on the purpose of its use. In other words, generally speaking, the size of the micro-sphere is not limited at all.

In case that the micro-sphere is made of glass, it is preferably made of one selected from the group consisting of fluoride glasses, chloride glasses, bromide glasses and chlorofluoride glasses. In particular, in view of the chemical durability and the mechanical strength of the micro-sphere, the micro-sphere is preferably made of one selected from the group consisting of an $AlF_3$-based fluoride glass, an $InF_3$-based fluoride glass and a $ZrF_4$-based fluoride glass, which glasses are free of alkali ions. In view of the oscillation efficiency, it is preferable to use a glass which is small in phonon energy. Furthermore, it is not preferable to use a glass which has its intrinsic absorption at the excitation light wavelength and the upconversion laser oscillation wavelength. With the use of this glass, the oscillation efficiency may be lowered.

In case that the micro-sphere is made of crystal, it is preferably made of one selected from the group consisting of fluoride single crystals, chloride single crystals, bromide single crystals and iodide single crystals. In particular, in view of the chemical durability and the mechanical strength of the micro-sphere, the micro-sphere is preferably made of fluoride single crystals such as $BaF_2$, $CaF_2$ and $LiYF_4$. In view of the oscillation efficiency, it is preferable to use a crystal which is small in phonon energy. Furthermore, it is not preferable to use a crystal which has its intrinsic absorption at the excitation light wavelength and the upconversion laser oscillation wavelength. With the use of this crystal, the oscillation efficiency may be lowered.

The upconversion laser oscillation scheme will be briefly described in the following. When the micro-sphere of the present invention is irradiated With an excitation laser light which is to be oscillated by the light energy in the light absorption region of the rare-earth-element ion, this ion is excited from the first energy level to the second energy level higher than the first energy level. Then, the ion is further excited from the second energy level or from the third energy level which is lower than the second energy level and higher than the first energy level, to the fourth energy level higher than the second energy level, by the energy transfer from another excited ion to the excited ion (see FIG. 1) or by the excited state absorption (ESA) (see FIG. 2). Then, the upconversion laser oscillation, where the output laser wavelength is shorter than the input laser wavelength, occurs within the micro-sphere, by the luminous transition from the fourth energy level or from the fifth energy level which is lower than the fourth energy level and higher than the second energy level, to the first energy level. When the upconversion laser light is incident on the outer surface of the micro-sphere at an angle larger than the critical angle, this upconversion laser light is repeatedly totally reflected on the outer surface of the micro-sphere. Furthermore, when the thus totally reflected light rotating within the micro-sphere has the same phase, this light resonates within the micro-sphere. In other words, the micro-sphere serves as a resonator. Thus, the output laser light oscillates by the population inversion between the fourth or fifth energy level and the first energy level. This output laser light has a wavelength corresponding to the energy difference between the fourth or fifth energy level and the first energy level.

The following nonlimitative examples are illustrative of the present invention.

EXAMPLE 1

In this example, a micro-sphere made of glass was used to obtain an upconversion laser oscillation. As is seen from FIG. 3, a laser apparatus 10 used in this example had an excitation light source 12, a first condensing lens 14 for condensing the excitation light, a rare earth element ion doped micro-sphere 16 made of glass, an elliptical reflector 18 for reflecting the upconversion laser light from the micro-sphere 16, an optical fiber 20 for transmitting the light focused thereon by the reflector 18, and a second condensing lens 22 for condensing the light from the fiber 20.

A semiconductor laser was used as the excitation light source 12. The micro-sphere 16 had a diameter of 300 µm and contained 700 ppm of $Er^{3+}$. The micro-sphere 16 was a fluoride glass containing 45 mol % of $InF_3$, 30 mol % of $PbF_2$ and 25 mol % of $ZnF_2$. This micro-sphere 16 was prepared by dropping a glass melt into a cooling liquid which is not decomposable at the temperature of the glass melt, as is disclosed in JP-A-7-41328.

Figure 4:
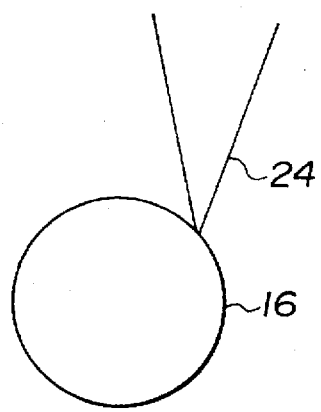
FIG. 4 is an enlarged schematic view showing a condensed excitation light applied to the surface of a micro-sphere of the present invention.

An upconversion laser oscillation was obtained using the apparatus 10, as follows. At first, a laser light having a wavelength of 800 nm from the excitation light source 12 was condensed by the first condensing lens 14. Then, as shown in FIG. 4, the condensed laser light 24 was applied to the surface of the micro-sphere 16. With this, the occurrence of an upconversion laser oscillation at 550 nm on the $^4S_{3/2} \rightarrow {}^4I_{15/2}$ transition of $Er^{3+}$, caused by both of the excitation of the $^4I_{15/2} \rightarrow {}^4I_{9/2}$ transition of $Er^{3+}$ and the excitation of the $^4I_{11/2} \rightarrow {}^4F_{7/2}$ transition of $Er^{3+}$, was ascertained by the presence of the oscillation spectrum and the threshold value (100 mW).

Furthermore, another micro-sphere made of a $Tm^{3+}$-doped fluoride glass containing 65 mol % $ZrF_4$ and 35 mol % $BaF_2$ was prepared. Using this another micro-sphere, the occurrence of an upconversion laser light at 480 nm was ascertained with the apparatus 10 in which a dye laser at 650 nm as the excitation light source 12 was used in place of the semiconductor laser.

It should be noted that, in addition to the above fluoride glasses of Example 1, either a $ZrF_4$—$BaCl_2$-based mixed halide glass or an AgBr—PbBr-based bromide glass may be used as the upconversion laser material, and that $Ho^{3+}$, $Pr^{3+}$, $Dy^{3+}$ or $Nd^{3+}$ may be used as the dopant in place of Er3+ or $Tm^{3+}$ of Example 1. In this case, it is possible to obtain an upconversion laser light by changing the excitation wavelength.

EXAMPLE 2

In this example, Example 1 was slightly modified as follows.

A micro-sphere having a diameter of 500 μm and made of $LiYF_4$ single crystal doped with 500 ppm $Er^{3+}$ was used. Using this micro-sphere, the occurrence of the same upconversion laser oscillation as that of Example 1 was ascertained by the presence of the oscillation spectrum and the threshold value (150 mW). Furthermore, another micro-sphere made of $Tm^{3+}$-doped $LiYF_4$ single crystal was prepared. Using this another micro-sphere, the occurrence of the upconversion laser light at 480 nm was ascertained with the apparatus 10 in which a dye laser at 650 nm as the excitation light source 12 was used.

It should be noted that, in addition to the above fluoride single crystals of Example 2, either $LaF_3$ single crystal, $BaF_2$ single crystal, NaCl or KBr single crystal may be used as the upconversion laser material, and that $Ho^{3+}$, $Pr^{3+}$, $Dy^{3+}$ or $Nd^{3+}$ may be used as the dopant in place of Er3+ or $Tm^{3+}$ of Example 2. In this case, it is possible to obtain the upconversion laser light by changing the excitation wavelength.

What is claimed is:

1. An upconversion laser material comprising:

a micro-sphere which is doped with an ion of a rare earth element and which is made of a member selected from the group consisting of fluoride glasses, chloride glasses, bromide glasses, chlorofluoride glasses, fluoride single crystals, chloride single crystals, bromide single crystals and iodide single crystals; wherein said rare earth element is a member selected from the group consisting of erbium, holmium, praseodymium, thulium, neodymium and dysprosium.

2. An upconversion laser material according to claim 1, wherein content of said ion in said micro-sphere is within a range from 50 to 5,000 ppm.

3. An upconversion laser material according claim 1, wherein said micro-sphere has a diameter within a range from 50 to 2,000 μm.

4. An upconversion laser material according to claim 1, wherein said micro-sphere comprises a member selected from the group consisting of $AlF_3$-based fluoride glass, $InF_3$-based fluoride glass, $ZrF_4$-based fluoride glass, $ZrF_4$-$BaCl_2$-based mixed halide glass, and AgBr—PbBr-based bromide glass.

5. An upconversion laser material according to claim 1, wherein said micro-sphere comprises a member selected from the group consisting of $BaF_2$ single crystal, $CaF_2$ single crystal, $LiYF_4$ single crystal, $LaF_3$ single crystal, $BaF_2$ single crystal, NaCl single crystal, and KBr single crystal.

* * * * *